United States Patent [19]

Gazzarini

[11] 4,026,406
[45] May 31, 1977

[54] MACHINE FOR WITHDRAWING BREAD SLICES OR LIKE PRODUCTS FROM A CONTINUOUS CYCLE BELT-TYPE BAKING OVEN, AND PRESENTING THEM IN A HORIZONTAL STACK

[75] Inventor: Vinicio Gazzarini, Reggio Emilia, Italy

[73] Assignee: Barilla G. & R. F.11i S.p.A., Parma, Italy

[22] Filed: July 8, 1975

[21] Appl. No.: 593,984

[52] U.S. Cl. .............................. 198/420; 198/424; 198/448; 198/458; 198/626
[51] Int. Cl.² ...................................... B65G 47/22
[58] Field of Search .................. 198/29, 32, 45, 82, 198/102, 34, 31 R, 278, 277, 420, 424, 448, 458, 601, 604, 626, 569

[56] References Cited
UNITED STATES PATENTS

| | | | |
|---|---|---|---|
| 2,645,327 | 7/1953 | Hildmann | 198/29 |
| 2,735,599 | 2/1956 | Thurman | 198/34 X |
| 3,037,610 | 6/1962 | Morton et al. | 198/29 X |
| 3,901,374 | 8/1975 | Dubuit | 198/279 X |

Primary Examiner—Johnny D. Cherry
Assistant Examiner—Douglas D. Watts
Attorney, Agent, or Firm—Brisebois & Kruger

[57] ABSTRACT

Machine for bread slices or like products comprises a first conveyor on which the slices lie, means downstream of the said first conveyor to shift the rusks from a plane position to a vertical position on a second conveyor, consisting of a set of inclined chutes, aligning means on this second conveyor, acting alternatively on two transverse lines of the second conveyor, being provided. Downstream of the said second conveyor, a third conveyor is located in a transverse position, on which the transverse lines of slices are frontally discharged, and aligned. Lateral means in the form of two sets of vertical plates provided with mutually facing bristles are provided on the said third conveyor to vertically support said rusks. Downstream of said third conveyor are provided means to receive a predetermined amount of rusks to be packaged.

6 Claims, 13 Drawing Figures

MACHINE FOR WITHDRAWING BREAD SLICES OR LIKE PRODUCTS FROM A CONTINUOUS CYCLE BELT-TYPE BAKING OVEN, AND PRESENTING THEM IN A HORIZONTAL STACK

SUMMARY OF THE INVENTION

This invention relates to a machine for withdrawing bread slices, rusks or the like products from a baking oven and presenting them in an orderly horizontal stack on a suitable conveyor belt.

The production cycle for rusks comprises their final baking inside an oven while disposed in orderly transverse mutually equidistant lines on a continuous conveyor belt which moves forward inside the oven.

On leaving the oven the rusks are at present taken manually and arranged in packs or small stacks for subsequent wrapping in paper and packaging in boxes.

It is immediately evident that this procedure leads to a heavy incidence of labour cost on the final rusk price and does not enable the high production rates now necessary for compnay economy to be attained.

The object of the present invention is therefore to provide a machine which completely automatically withdraws these rusks from the belt on which they are located in the baking oven and arranges them in an orderly horizontal pile on a suitable conveyor.

According to the invention this is attained by disposing suitable means at the oven outlet, consisting of a continuous conveyor belt divided into parallel paths of travel by longitudinal guides within which a single line of rusks advances.

Downstream of said conveyor belt each path of travel meets an analogous path of travel of an underlying orthogonal conveyor belt, in which however the rusks are arranged vertically resting on their edge.

Downstream of said second conveyor belt, according to the invention, a third and last conveyor belt in provided parallel to the first, and on to which flow the transverse lines of rusks which are positioned vertically on the second conveyor belt, these lines being made to advance so that they generate a single horizontal stack supported by a suitable conveyor situated downstream of the third conveyor belt and in continuation thereof.

According to the invention means are provided for ensuring the vertical equilibrium of the rusks, both on the second and third conveyor belts, and suitable drive means for operating the entire device in synchronism.

Said drive means will not be described in detail hereinafter in that they are of normal construction and known to experts of the art.

The operational and constructional characteristics of the invention will be more evident from the detailed description given hereinafter and illustrated by the figures of the accompanying drawings which relate to several preferred embodiments shown by way of non-limiting example.

FIG. 11 shows the same detail in a thrid working position;

FIGS. 1 to 5 show a baking oven 1 from which emerges a continuous band 2 on which the rusks 3 are aligned along several equidistant lines.

Downstream of said conveyor belt there is a first conveyor comprising a pair of lateral chains 4 and 5 between which resilient support means 6 are stretched.

The chains 5 and 5 diverge slightly in the direction of motion so that the rusks 3 placed on the resilient supports 6 spread slightly apart along this portion.

Downstream of the chains provided with resilient supports 6 there is positioned a horizontal continuous belt 7 forming the second past of said first conveyor.

A plate 77 of saw tooth cross-section is positioned upstream of the belt 7 to guide the rusks in such a manner that they all come to rest on the deep side of their respective channel in equidistant relationship.

Said belt 7 is stretched between two end rollers 8 and 9 and is supported by a frame 10.

Motion is transmitted by a motorised reduction unit provided with speed control means 11 and connected to the roller 9 by a belt or chain transmission 12.

A plurality of parallel guides 14 is disposed on said conveyor belt in such a manner as to define a like number of paths of travel for the rusks which are discharged on to it by the upstream conveyor and brought into equidistant relationship by the plate 77 comprising converging channels.

The conveyor 7 advances with continuous motion in synchronism with the speed of advancement of the rusks inside the oven.

On the aforementioned coveyor belt 7 there are thus several longitudinal lines of rusks present, guided between the guides 14.

These lines are thrust on to an intermediate fixed surface 15 from which a set of chutes extends, in a substantially semi-cylindrical manner.

These chutes are indicated by the reference numberal 16 and are of "C" cross-section to prevent the rusks overturning.

Each path of travel on the intermediate surface 15 thus flows into one of the chutes 16, along which the rusks fall one by one on to a second conveyor comprising an underlying transverse belt 17, located at a conveniently lower level.

Longitudinal guides 18 are provided on the belt 17 to keep the rusks vertical.

At the meeting point between each of the chutes 16 and each of the guides 18 there are bristles 19 pointing downwards to prevent the rusks bouncing.

Transverse pins 13 are provided at the zone of engagement between the surface 15 and guides 16 at a distance from the surface equal approximately to the thickness of the rusks, their purpose being to keep the rusks perfectly horizontal until they leave the surface 15 in order to prevent the rusks overlapping.

Thus on the belt 17 located downstream and under the belt 7, as many lines of successive vertical rusks advance as there are paths of travel on the belt 7.

Members for arresting the advancement of the rusks are provided in proximity to the end of the conveyor belt 17 to release in orderly succession the several transverse lines of rusks and lead them to a subsequent orthogonal conveyor on which the horizontal stacks are formed.

The conveyor belt 17 extends between two rollers 20 and 21, and is supported by a frame 22. The roller 20 is rotated by a self-contained drive unit 200 preferably provided with a speed varying means, and operating in synchronism with the conveyor belt 7.

Figure 1:
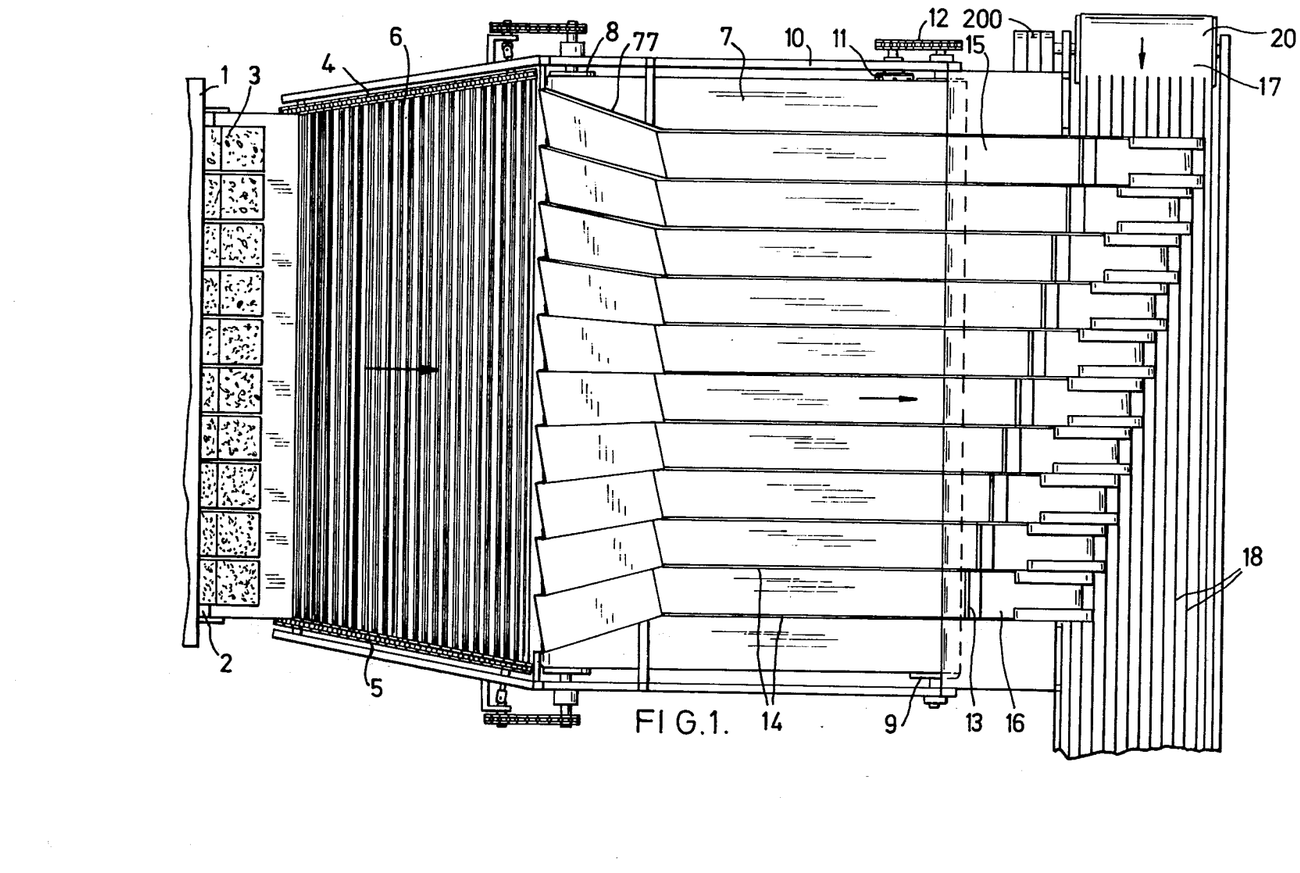
FIG. 1 is a plan view of one possible embodiment of the invention.
Figure 2:
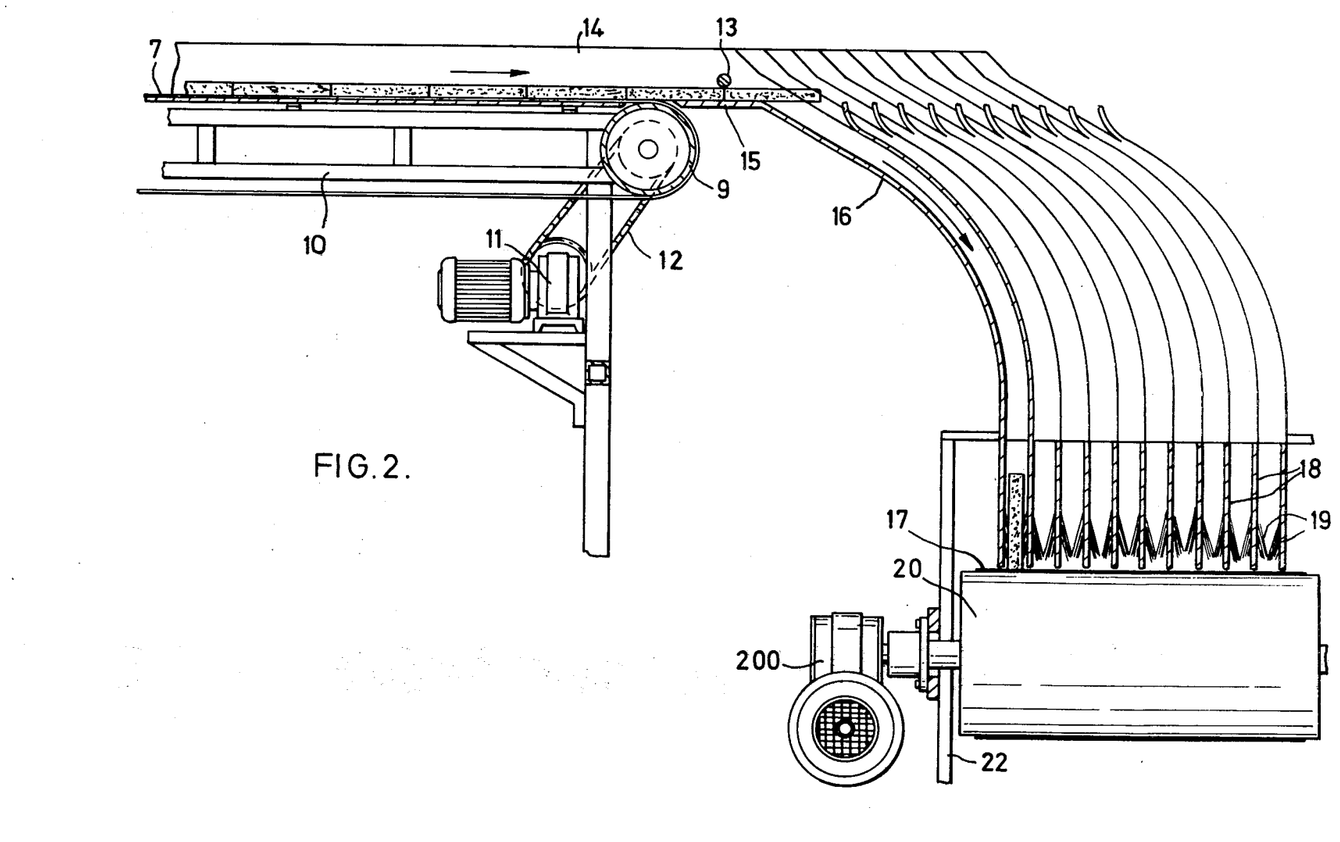
FIG. 2 is a sectional side view of the same embodiment.
Figure 2:
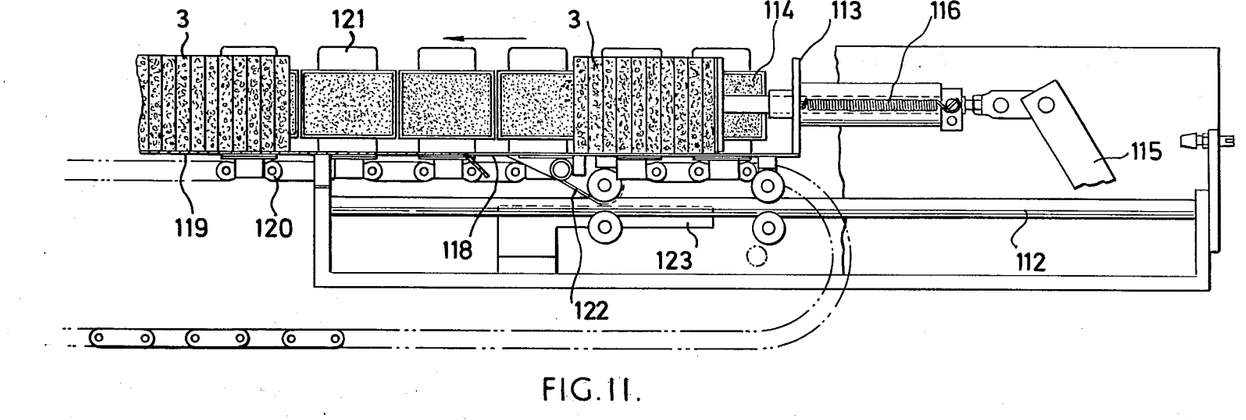
Figure 3:
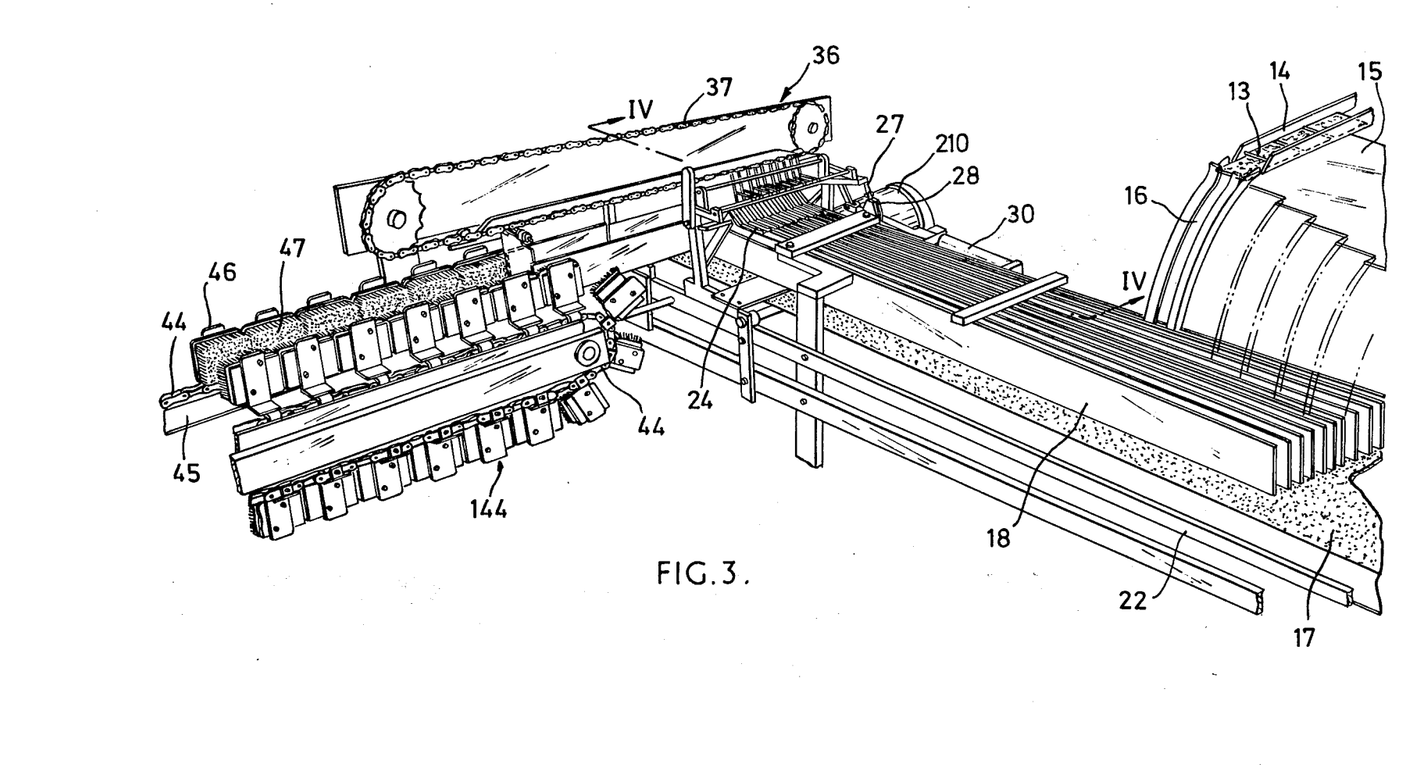
FIG. 3 is a perspective view of the central part of the device according to the first embodiment.
Figure 4:
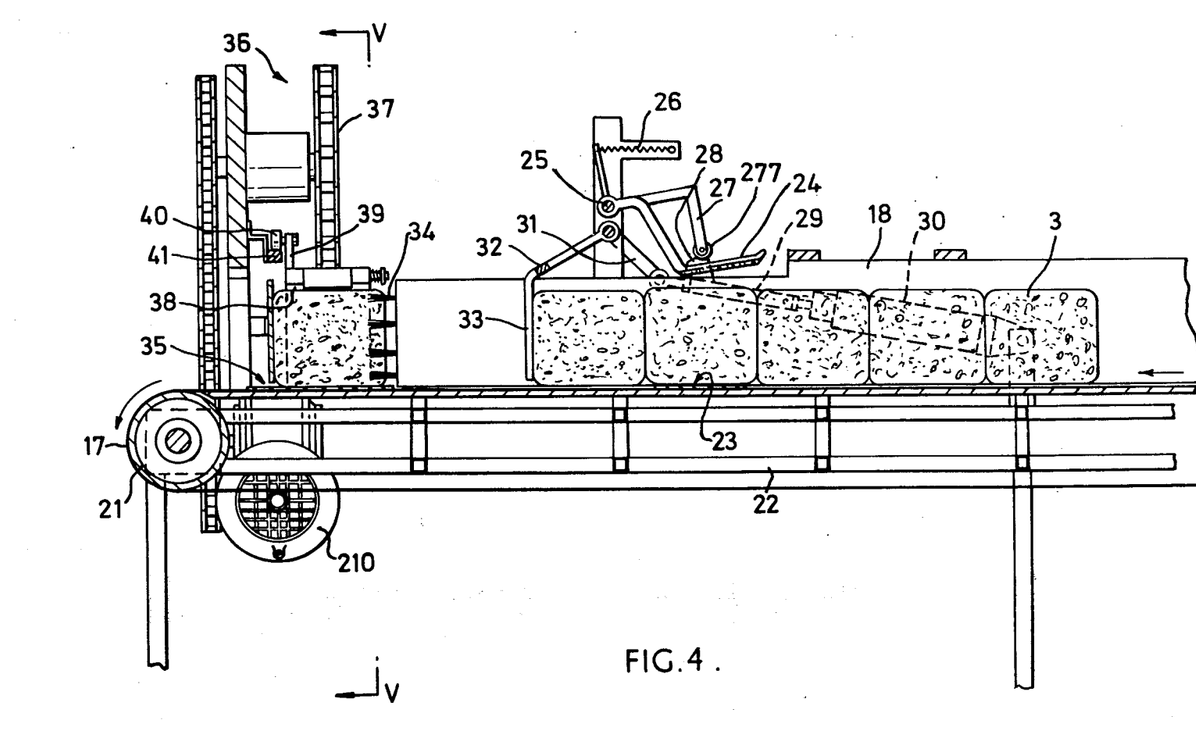
FIG. 4 is a section on the line IV—IV of FIG. 3.
Figure 5:
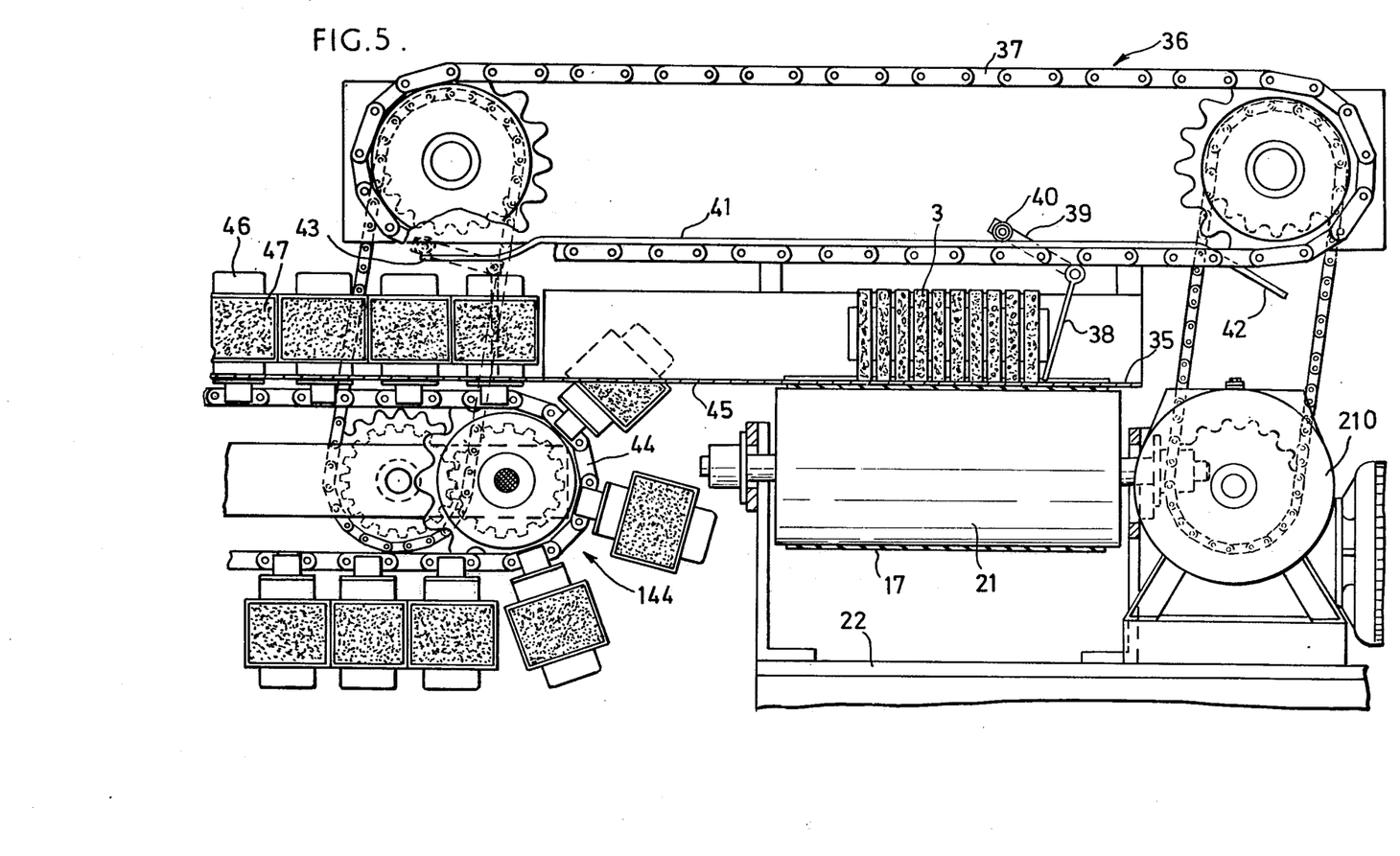
FIG. 5 is a section on the line V—V of FIG. 4.

FIGS. 4 and 5 show that approximately at the end of the conveyor belt 17 there is provided a transverse plate 23 under which the belt 17 runs.

All the rusks 3 which travel vertically on the conveyor belt 17 slide successively on the transverse plate 23.

The width of the plate 23 is at least equal to the width of the conveyor belt 17.

Shoes 24 provided with a lower soft surface are located in a position above the plate 23, and oscillate in an upwards and downwards direction. These shoes derive from a transverse shaft 25, with respect to which they possess a certain degree of freedom.

The shoes 24 are mounted idly with a unilateral torsional stop on the shaft 25, and are kept pressed downwards by a spring 26.

A projection 27 extends from the end of the shaft 25 and slides on a cam 28 situated on the rod 29 of a cylinder-piston unit 30 fixed to the frame 22.

The end of the rod of the cylinder-piston unit 30 is fixed to an arm 31 connected to a transverse frame 32 from which a plurality of projections 33 extend downwards.

The projections 33 are inserted individually between the longitudinal guides 18 provided on the belt 17.

It is immediately evident from FIG. 4 that the advancement of the rod 29 of the cylinder-piston unit induces the guide roller 277 of the cam 28 to descend, consequently lowering the shoes 24 and temporarily blocking a transverse line of rusks 3 on the plate 23.

Furthermore, as the rod 29 advances it acts on the arm 31 and induces a clockwise rotation of the shaft on which the projections 33 are keyed, so raising these latter. The operation of the cylinder-piston unti 30 is controlled cyclically by a microswitch operated by the chain 37 of the pusher, described hereinafter.

The projections 33 are spaced apart in plan from the plate 23 by a distance substantially equal to the transverse dimensions of a rusk 3.

As the belt 17 moves with continuous motion, the successive repetition of operation of the cylinder-piston unit 30 causes cyclic blocking of a transverse line of rusks 3 on the plate 23 and the simultaneous release of the line of rusks situated immediately downstream, and which advance with the belt into a position above a portion of transverse plate downstream of the belt.

Each of the guides 18 terminates downstream in a set of bristles or resilient reeds 34 for the purpose of keeping the rusks vertical, even where not all the channels defined by the guides 18 are occupied.

A pusher 36 is provided above the portion of flat plate 35 situated downstream of the bristles 34.

This pusher is better illustrated in FIG. 5 and consists substantially of a transverse chain 37 which moves cyclically and supports a plurality of thrust blades 38.

Each thrust blade 38 is pivoted to the chain 37 and is provided with resilient means which keep it preferentially adjacent and parallel to the chain 37.

Each blade 38 also comprises an orthogonal projection 39 provided with a roller 40. The roller 40 slides on a horizontal guide cam 41 provided in a position corresponding with the lower portion of the chain 37 and comprising two inclined end portions 42 and 43.

The portion 42 receives the rollers 40 at the beginning of the working stroke of the pusher unit, and guides the thrust blade 38 into a position orthogonal to the chain 37.

The portion 43 is situated at the opposite end and gradually returns the blade 38 into a position parallel to the chain 37 to prevent it interfering with the horizontal stack of rusks present downstream.

It is evident from the description that a certain number of parallel vertical rusks is brought under the action of the thrust planes 38, each of which acts cyclically in the sense of transferring these rusks on to a suitable third conveyor 144 located downstream.

Said conveyor consists of a lower fixed surface 45 situated in continuation of the fixed plate 35, on to which the rusks thrust forward by the conveyor 17 flow.

To the side of this surface 45 there are two chains 44 each of which supports a set of orthogonal appendices 46 individually provided with a set of bristles 47.

These bristles are able to laterally grip the rusks and drag them forward on to the surface 45 while keeping them vertical.

A normal buffer conveyor is situated downstream of the conveyor 144, and from which the vertical stack of rusks thus formed is fed directly to the feed channel of the wrapping machine.

Both the conveyor 144 and the pusher 37 are driven by a selfcontained drive unit 20 supported by the frame 22.

FIGS. 6 to 12 illustrate the machine terminal portion for generating the horizontal stacks of a further embodiment of the invention.

The device according to this second embodiment is constructed in a manner analogous to the description given heretofore as far as the point immediately upstream of the chutes 16.

The same reference number 7 therefore indicates the conveyor belt which connects the outlet section of the baking oven to the stacking device.

In the second embodiment, this device is in the form of a set of chutes situated in a vertical plane and indicated by the reference numeral 101.

The number of chutes is equal to the number of paths of travel present of the belt 7 defined by the longitudinal guides 14 provided thereon.

They converge into an outlet housing or chamber 102 comprising as many guides or vertical separation walls as there are rusks arriving from the belt 7.

The rusks travel on the chutes 101 in a direction orthogonal to the direction of the belt 7, and then overturn so that they rest on one side.

The vertical length of the vertical portion of said outlet housing or chamber is substantially equal to double the transverse dimension of each rusk.

Figure 7:
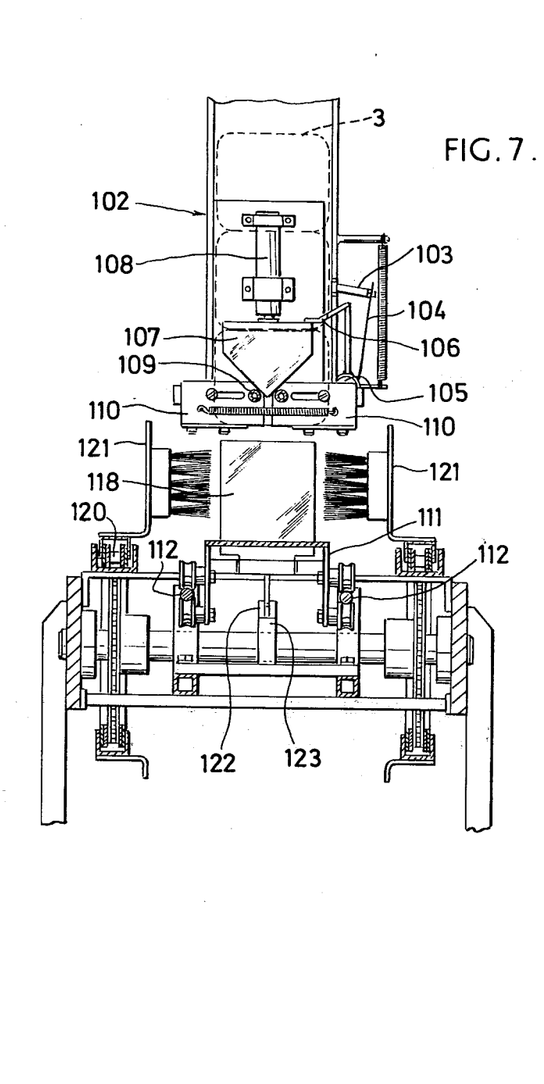
FIG. 7 is a section on the line VII—VII of FIG. 6.
Figure 8:
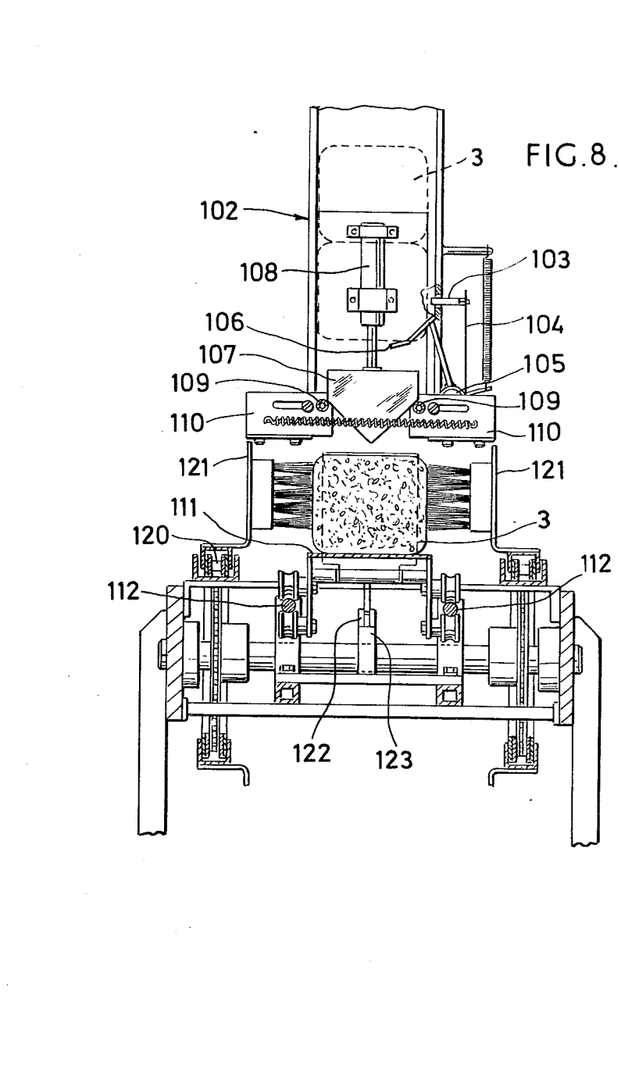
FIG. 8 shows the device of FIG. 7 in a second working position.

Two superimposed sections are defined in the chamber 102 provided with internal walls 101, as shown in FIGS. 7 and 8.

A first line of vertical rusks situated upstream is kept at rest by a set of pegs 103 individually supported by a spring 104 wound around a shaft 105.

The shaft 105 may make small rotations because of the engagement of a projection 106 with the upper surface of a triangular cam 107 situated laterally to the chamber 102 and driven by a cylinder-piston unit 108.

The point of this cam is inserted between two rollers 109, each of which is rigid with a lower plate 110.

The two lower plates 110 mutually withdraw and approach in synchronism with the downward and upward movements of the triangular cam 107, so inducing the line of rusks 3 situated at the base of the chamber 102 to fall downwards.

The projection 106 rotates in the anti-clockwise direction, with reference to FIGS. 7 and 8, in synchronism with the withdrawal of the two plates 110, and causes the resilient pegs 103 to become inserted in a like number of holes present in the housing 102 in such a manner that the pegs 103 lock the penultimate line of rusks 3 downstream of the housing 102 in position.

These operations are repeated in order and cause one line after another to fall downwards.

These lines fall into a transverse trolley 111 located below the housing 102.

The trolley 111 runs on a pair of suitable rails 112 and has a fixed end wall 113.

A rod 114 provided with an end plate penetrates into the trolley 111 through this wall.

Figure 6:
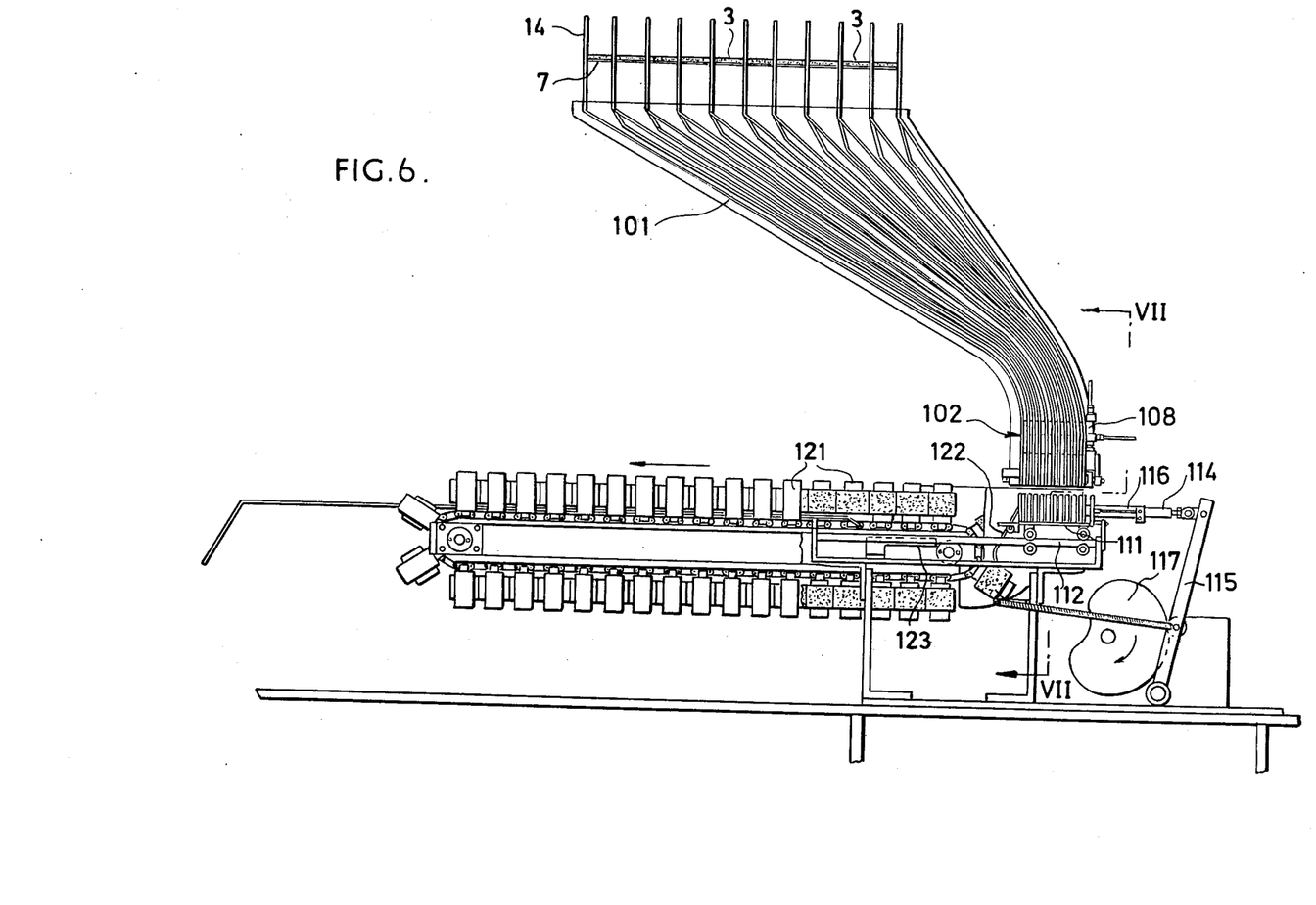
FIG. 6 is a frontal view of the end part of a second embodiment of the invention.
Figure 9:
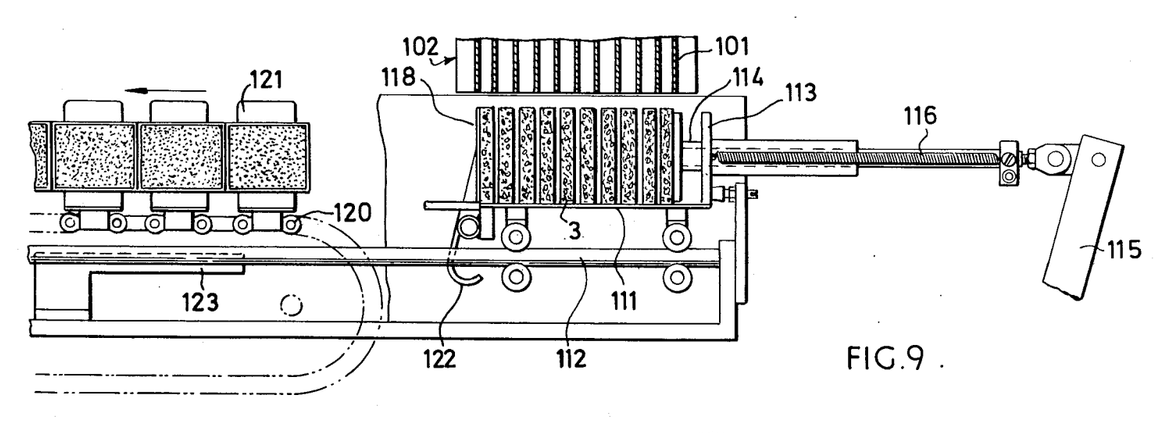
FIG. 9 is an enlarged detail of FIG. 6 in one working position.

The rod 114 is connected to a lever 115 which is kept pressed in the direction of the housing 102 by a spring 116, and is subjected to oscillation by a cam 117 driven with continuous motion (see FIGS. 6 and 9).

Figure 10:
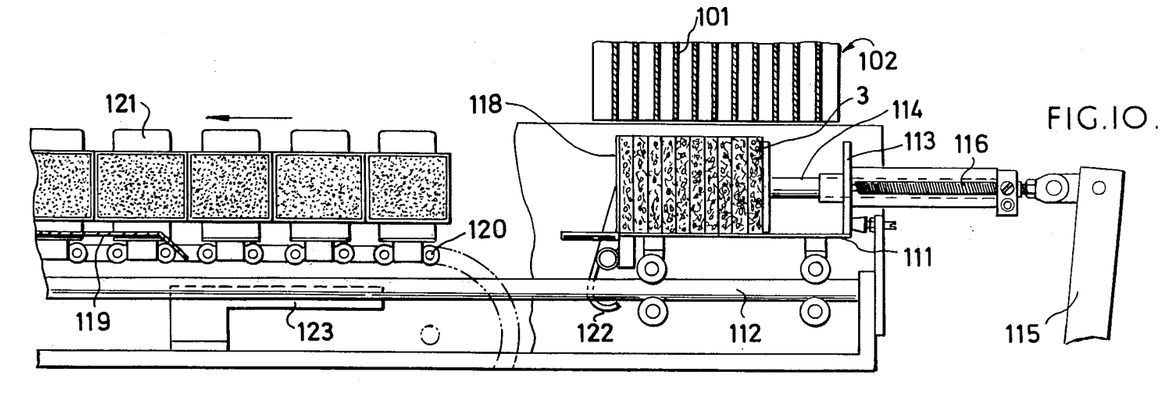
FIG. 10 shows the same detail in a second working position.

When a set of rusks has fallen on to the floor 111 of the trolley, the rotation of the cam 117 causes the lever 115 to advance towards the left and thrust the rod 114 and the relative plate into the trolley, so causing all the rusks to become grouped against the opposite end wall 118 of the trolley (see FIG. 10).

This wall is pivoted to the base and kept vertical by suitable resilient means.

The trolley floor 111 is situated at the same level as a continuous plate 119 located between two chains 120, each of which supports projections 121 analogous to the projections 46 described in the first preferred embodiment.

The wall 118 is kept vertical by suitable resilient means and comprises lowerly a projection 122 which, during the advancement of the trolley towards the left in FIG. 9 (and better illustrated in FIGS. 10 and 11), hits against a fixed stop 135 so causing the wall 118 to rotate forwards.

In this manner the wall 118 becomes perfectly coplanar with the floor 111 of the trolley, and the pack of rusks positioned on the trolley is thrust forward by the rod 114 and the relative plate until it becomes engaged by the bristles projecting from the supports 121 mounted above the chains 120.

The pack thus formed is therefore gripped between these bristles and is pushed forward on the plate 119, until it flows into the usual conveyor or buffer situated downstream.

Figure 12:
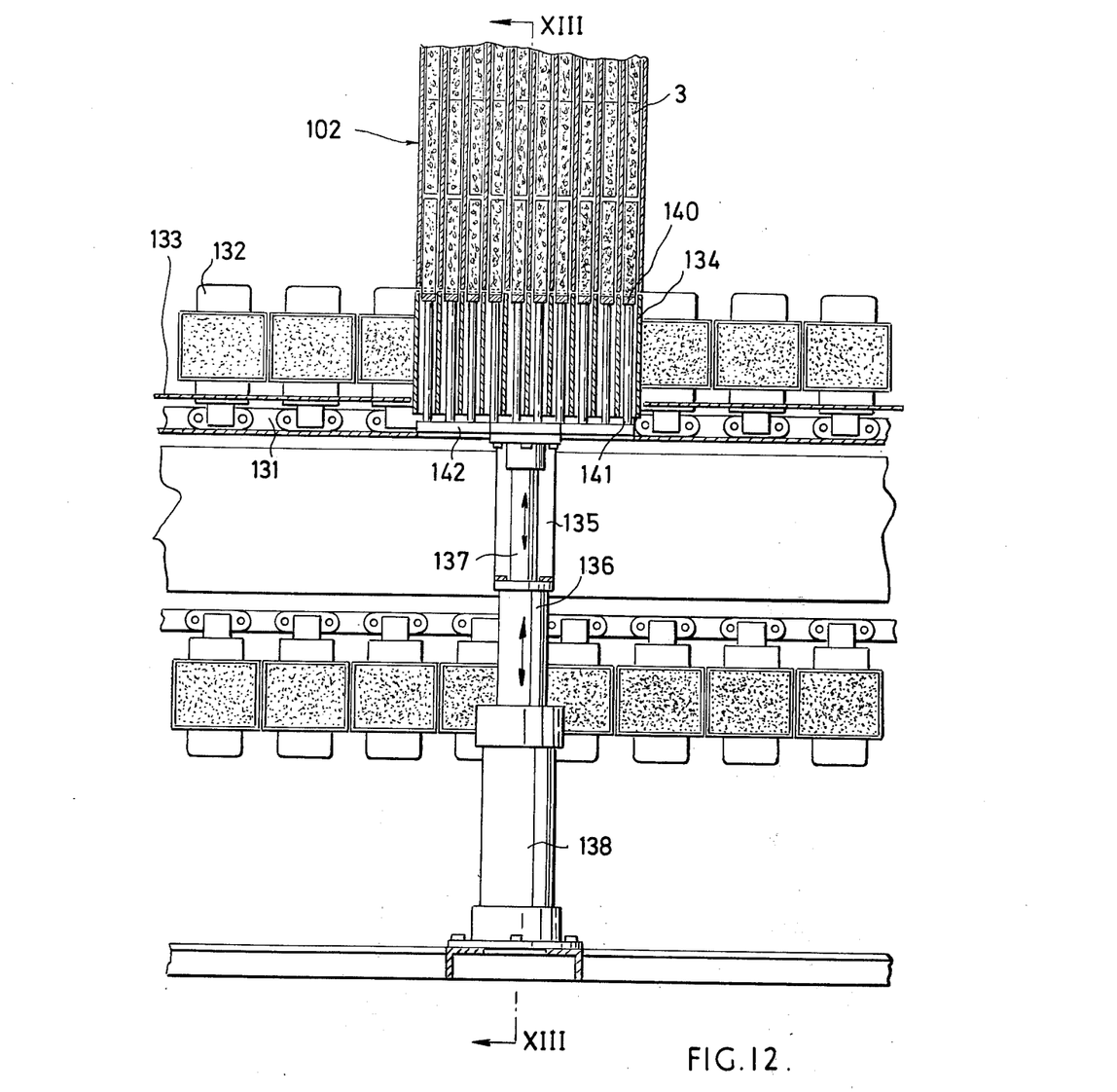
FIG. 12 is a possible embodiment equivalent to the embodiment shown in FIG. 6.
Figure 13:
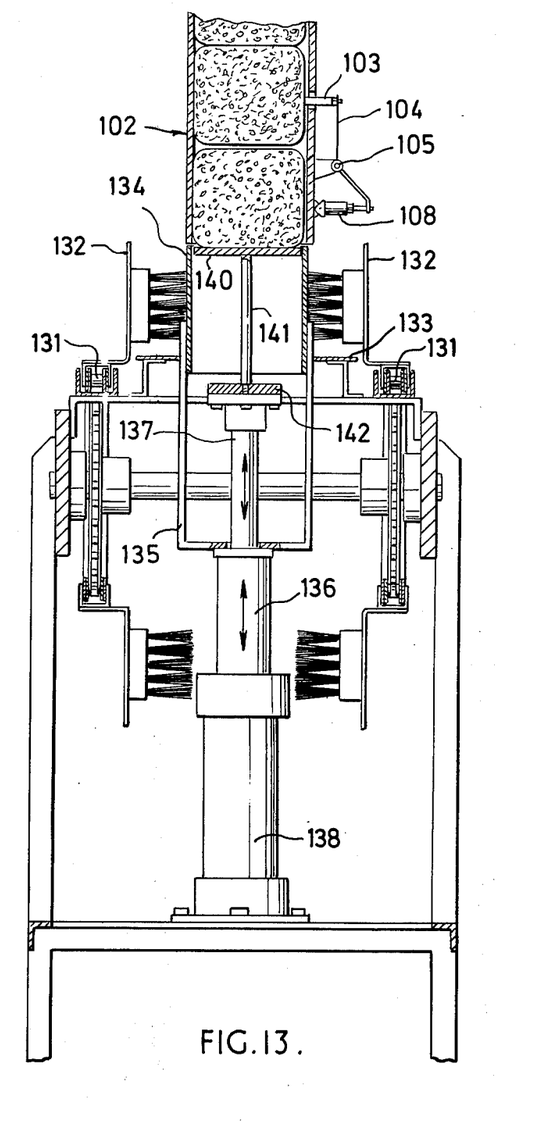
FIG. 13 is a section on the line XIII—XIII of FIG. 12.

A further embodiment is illustrated in FIGS. 12 and 13, which show only the devices for transferring the rusks from the outlet chamber 102 of the multiple chute 101 to a conveyor consisting of two lateral chains 131 provided with arms 132 with brushes pointing inwards, and which run at the side of a central sheet metal plate 133.

The two chains 131 and relative arms are analogous to the chains 120 and relative supports 121 already described and illustrated.

The plate 133 is interrupted below the chamber 102, which contrary to that already described lacks the lower means for supporting the rusks, operated by the triangular wedge cam.

In the opening in the plate 113, there is a vertically slidable box 134 without lower or upper walls and provided with the same number of internal dividing walls as the walls present in the chamber 102. The box 134 is supported from the outer cylindrical rod 136 of a double rod cylinder-piston unit 138, by may of a transverse bracket 135.

The box 134 has the same plan dimensions as the chamber 102.

In its highest position, the box is immediately below the chamber 102, while in its lowest position, the box 134 lies below the plate 133.

Inside the box 134 slide a number of coplanar crosspieces 140 individually branching from a like number of support columns 141 all connected to a common cross member 142.

The columns 141 are at least as long as the height of the box 134, so that the crosspieces 140 become located under the chamber 102 when in their highest position with the box raised, and become coplanar with the plate 133 when in their lowest position with the box raised.

The cross member 142 is fixed to the inner rod 137 of the telescopic cylinder-piston unit 138.

In FIGS. 12 and 13, the components common to the embodiment shown in FIGS. 6 to 11 have the same reference numerals.

The operation of the device described is evident.

The box 134 rises to stop the action of the bristles if the appendices 132, and the crosspieces 140 rise under the chambers 102.

The rusks fall on to the crosspieces 140 which are then lowered and bring the rusks into line with the plate 133.

The box 134 is then lowered and the rusks are dragged away by the bristles.

The cycle is then repeated.

The invention is not limited to the embodiments heretofore described, and modifications and improvements may be made to them without leaving the scope of the inventive idea, the fundamental characteristics of which are summarized in the following claims.

What we claim is:

1. Machine for handling bread slices and the like comprising:
    successive first, second and third conveyor means, the first of which is adapted to receive a plurality of parallel rows of said slices while lying flat, and the second of which comprises a belt and guide means above said belt,
    inclined chute means defining a plurality of parallel channels at the outlet end of said first conveyor means for delivering said slices to said second conveyor means, said chute being positioned and configured to deliver said slices onto said second conveyor with their edges downward and their major surfaces parallel to the path of travel of said second conveyor means, and means for dividing said slices into groups having aligned vertical edges as said second conveyor means advances, said dividing means comprising means for halting a transverse line of vertical slides in a certain section of the belt including a set of levers having a soft surface, which branch from a transverse shaft and lie above the belt, and are arranged for insertion between the guides situated on the belt and a fixed plate situated on the belt below said levers and on which the slices are pressed, said levers being mounted on a rotatable shaft controlled by the engagement of a lateral lever fixed to the shaft with a translatable cam fixed to the rod of a cylinder-piston unit, said third conveyor means being positioned at the output end of said second conveyor means and at right angles thereto so as to receive said groups of slices from said second conveyor means and advance them in a direction perpendicular to the major surfaces of said slices.

2. Machine as claimed in claim 1 comprising second means for halting, alternately and in synchronism with the first means, a line of vertical slices on said second conveyor means in a section immediately downstream of the section in which said first halting means act, said second halting means comprising a set of vertical projections which project from a second shaft situated above the belt, and are inserted between the guides above the belt, the rotation of said second shaft in one direction or the other being controlled by the engagement of a lever perpendicular to the shaft with the rod of a cylinder-piston unit.

3. Machine as claimed in claim 2, wherein the two said shafts carrying said halting means are driven from the same cylinder-piston unit.

4. Machine for handling bread slices and the like comprising:

successive first, second and third conveyor means, the first of which is adapted to receive a plurality of parallel rows of said slices while lying flat, inclined chute means defining a plurality of parallel channels at the outlet end of said first conveyor means for delivering said slices to said second conveyor means, said chute being positioned and configured to deliver said slices onto said second conveyor with their edges downward and their major surfaces parallel to the path of travel of said second conveyor means, means to lock a lower row of slices in the lower end of said chute which consist of two horizontal half-plates biased toward each other by suitable springs, and mounted to slide in suitable guides, and a triangular wedge-shaped cam adapted to slide between said guides to drive out said half-plates, and means for dividing said slices into groups having aligned vertical edges as said second conveyor means advances, said third conveyor means being positioned at the output end of said second conveyor means and at right angles thereto so as to receive said groups of slices from said second conveyor means and advance them in a direction perpendicular to the major surfaces of said slices.

5. Machine as claimed in claim 4, comprising means for blocking the penultimate row of slices in the bottom of said chute comprising a series of figures arranged to penetrate lateraly into said chute bottom and to individually block each slice, said fingers being supported at the end of resilient projections adapted to oscillate together, and mounted on a shaft which comprises a lever arranged to follow the vertical movements of the triangular wedge-shaped cam.

6. Machine for handling bread slices and the like comprising:

successive first, second and third conveyor means, the first of which is adapted to receive a plurality of parallel rows of said slices while lying flat, inclined chut means defining a plurality of parallel channels at the outlet end of said first conveyor means for delivering said slices to said second conveyor means, said chute being positioned and configured to deliver said slices onto said second conveyor with their edges downward and their major surfaces parallel to the path of travel of said second conveyor means, and means for dividing said slices into groups having aligned vertical edges as said second conveyor means advances, said third conveyor means being positioned at the output end of said second conveyor means and at right angles thereto so as to receive said groups of slices from said second conveyor means and advance them in a direction perpendicular to the major surfaces of said slices, said machine further comprising means arranged to receive, keep vertical and laterally thrust a line of slices to the output end of said belt, which comprise a fixed plate located at the outlet of said guides and means on said plate for pushing said slices in a lateral direction, which push means comprise a chain extending between two pinions so that it lies above said fixed plate, thrust blades branching from said chain at regular intervals, said blades being resiliently pivoted to the chain and tending to attain a position parallel to the chain, together with a cam which by acting on a projection from each of said blades, keeps them perpendicular to the chain over the entire length of the cam.

* * * * *